United States Patent
Williams et al.

(10) Patent No.: US 10,071,773 B2
(45) Date of Patent: Sep. 11, 2018

(54) VEHICLE ROOF STRUCTURES FOR CONCEALING ONE OR MORE SENSORS

(71) Applicant: Toyota Motor Engineering & Manufacturing North America, Inc., Erlanger, KY (US)

(72) Inventors: Paxton S. Williams, Milan, MI (US); Jaime N. Moore, Ann Arbor, MI (US); Crystal J. Mink, South Lyon, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 27 days.

(21) Appl. No.: 15/228,736

(22) Filed: Aug. 4, 2016

(65) Prior Publication Data
US 2018/0037267 A1 Feb. 8, 2018

(51) Int. Cl.
| | |
|---|---|
| *B62D 25/06* | (2006.01) |
| *B60R 11/00* | (2006.01) |
| *B60R 13/02* | (2006.01) |
| *B62D 35/00* | (2006.01) |
| *B60R 11/04* | (2006.01) |
| *G01S 13/93* | (2006.01) |

(52) U.S. Cl.
CPC .............. *B62D 25/06* (2013.01); *B60R 11/04* (2013.01); *B62D 35/00* (2013.01); *G01S 13/931* (2013.01); *G01S 2013/9367* (2013.01); *G01S 2013/9382* (2013.01)

(58) Field of Classification Search
CPC ................. B60R 11/00; B60R 13/0212; B60R 2011/0028; B62D 25/06; B62D 35/00; G01S 13/931; G01S 2013/9367; G01S 2013/9382

See application file for complete search history.

(56) References Cited

U.S. PATENT DOCUMENTS

| | | |
|---|---|---|
| 5,691,693 A | 11/1997 | Kithil |
| 6,661,115 B2 | 12/2003 | Lester |
| 7,081,810 B2 * | 7/2006 | Henderson ........... H01Q 1/3275 340/435 |

(Continued)

FOREIGN PATENT DOCUMENTS

| | | |
|---|---|---|
| DE | 102012023577 A1 | 6/2014 |
| WO | 2004067330 A1 | 8/2004 |
| WO | 2007131491 A2 | 11/2007 |

*Primary Examiner* — Darrell G Dayoan
*Assistant Examiner* — Melissa Ann Black
(74) *Attorney, Agent, or Firm* — Dinsmore & Shohl LLP

(57) ABSTRACT

A vehicle roof structure for concealing one or more sensors therein includes a roof panel, a windshield extending up to the roof panel, and a spoiler. The spoiler extends across at least a portion of a width of the roof panel and includes a leading portion that is substantially parallel to a windshield-roof interface, an apex, wherein a height of the spoiler increases from a height of the roof panel to a height of the apex as the spoiler extends from the leading portion to the apex in a vehicle longitudinal direction, and a trailing portion extending from the apex to the roof panel. A sensor volume is formed between the spoiler and the roof panel. One or more sensors are at least partially positioned within the sensor volume, wherein the one or more sensors output a signal indicative of a characteristic of an environment of the vehicle.

20 Claims, 7 Drawing Sheets

(56) References Cited

U.S. PATENT DOCUMENTS

| | | |
|---|---|---|
| 8,493,199 B2 | 7/2013 | Koehler et al. |
| 2009/0009604 A1 | 1/2009 | Kanaoka et al. |
| 2015/0338849 A1 | 11/2015 | Nemec et al. |

* cited by examiner

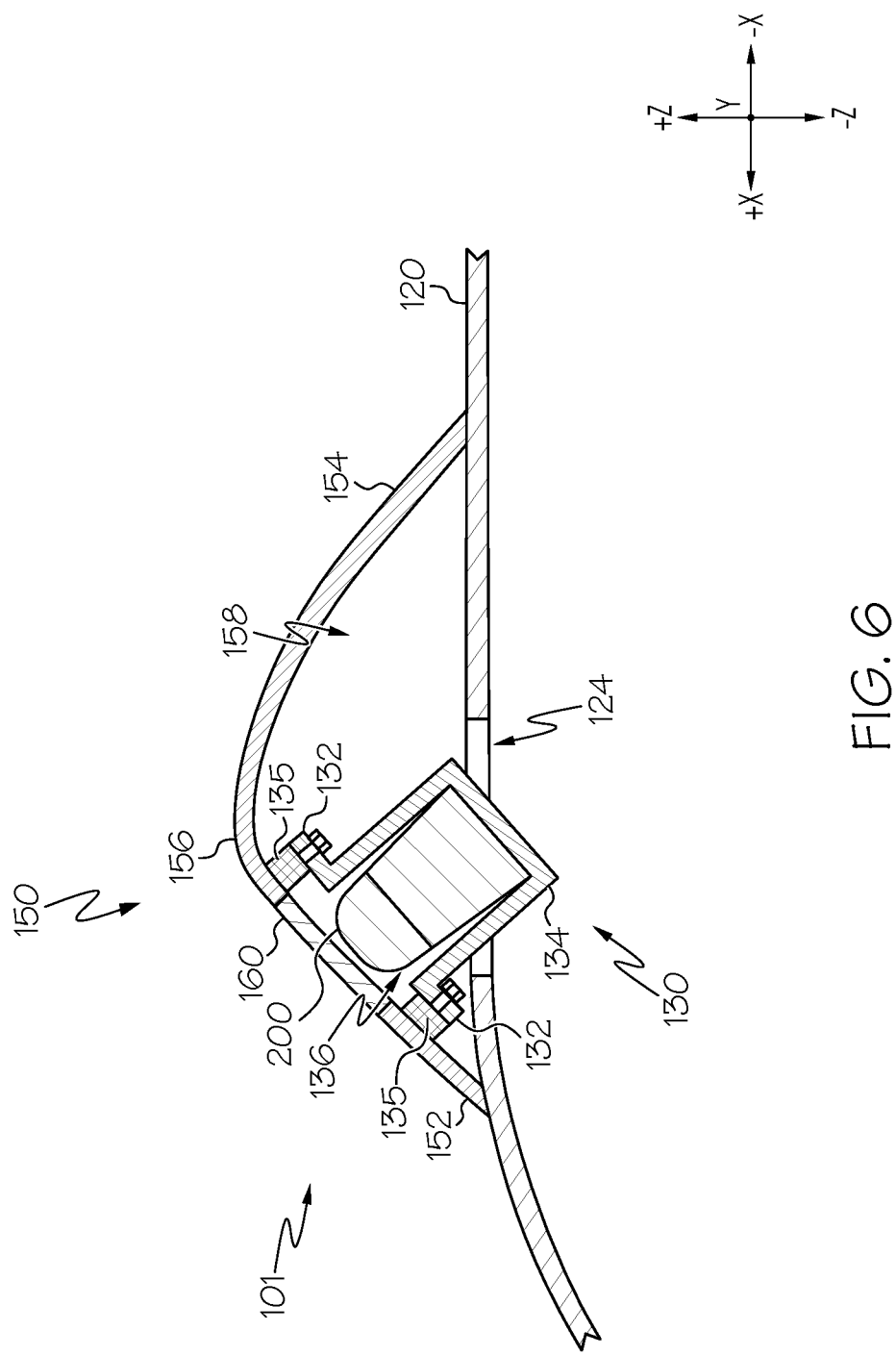

US 10,071,773 B2

VEHICLE ROOF STRUCTURES FOR CONCEALING ONE OR MORE SENSORS

TECHNICAL FIELD

The present specification generally relates to vehicles and, more specifically, to vehicle roof structures for concealing one or more sensors.

BACKGROUND

Vehicles on the road today use a variety of sensors to detect different aspects of an environment. These sensors may then communicate this detected information about the environment to the driver or cause the vehicle to react in some way (e.g. a rain sensor that causes the windshield wipers to swipe across the windshield.) Such sensors may need to be placed in a variety of locations on the vehicle. In many instances, it may be desirable to place certain sensors near or on the roof of the vehicle. However, because of the size or shape of some sensors, placing a sensor on the roof of the vehicle may be less visually appealing to consumers. For instance, large sensors, such as autonomous vehicle sensors, may not be easily concealable and are often found to be visually unattractive to many consumers.

Accordingly, a need exists for alternative vehicle roof structures for concealing vehicle sensors.

SUMMARY

In one embodiment, a vehicle includes a vehicle roof structure for concealing one or more sensors therein. The vehicle roof structure includes a roof panel, a windshield extending up to the roof panel, and a spoiler. The spoiler extends across at least a portion of a width of the roof panel in the vehicle lateral direction and includes a leading portion that is substantially parallel to a windshield-roof interface, an apex, wherein a height of the spoiler increases from a height of the roof panel to a height of the apex as the spoiler extends from the leading portion to the apex in a vehicle longitudinal direction, and a trailing portion extending from the apex to the roof panel, wherein a sensor volume is formed between the spoiler and the roof panel. The vehicle roof structure further includes one or more sensors at least partially positioned within the sensor volume, wherein the one or more sensors output a signal indicative of a characteristic of an environment of the vehicle.

In another embodiment, a vehicle includes a vehicle roof structure for concealing one or more sensors therein. The vehicle roof structure includes a roof panel, a windshield extending up to the roof panel, and a spoiler. The spoiler extends from a windshield-roof interface to an apex and from the apex towards a rear of the vehicle, a height of the spoiler decreasing to a height of the roof panel as the spoiler extends from the apex towards the rear of the vehicle in a vehicle longitudinal direction. The vehicle roof structure further includes a channel positioned in the roof panel beneath the spoiler and one or more sensors at least partially positioned within the channel, wherein the one or more sensors output a signal indicative of a characteristic of an environment of the vehicle.

In another embodiment, a vehicle comprising a vehicle roof structure for concealing one or more sensors includes a roof panel, a windshield extending up to the roof panel, a headliner extending along an interior portion of the roof panel, and a spoiler. The spoiler extends from a windshield-roof interface to an apex and from the apex towards a rear of the vehicle, a height of the spoiler decreasing to a height of the roof panel as the spoiler extends from the apex towards the rear of the vehicle in a vehicle longitudinal direction. A channel is positioned in the roof panel beneath the spoiler. A receptacle is coupled to the channel and extends toward the headliner. One or more sensors are at least partially positioned within the receptacle, wherein the one or more sensors output a signal indicative of a characteristic of an environment detected in a substantially forward direction of the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 6 schematically depicts an alternative cross-sectional view of the vehicle roof structure of FIG. 4, according to one or more embodiments shown and described herein.

DETAILED DESCRIPTION

Figure 1:
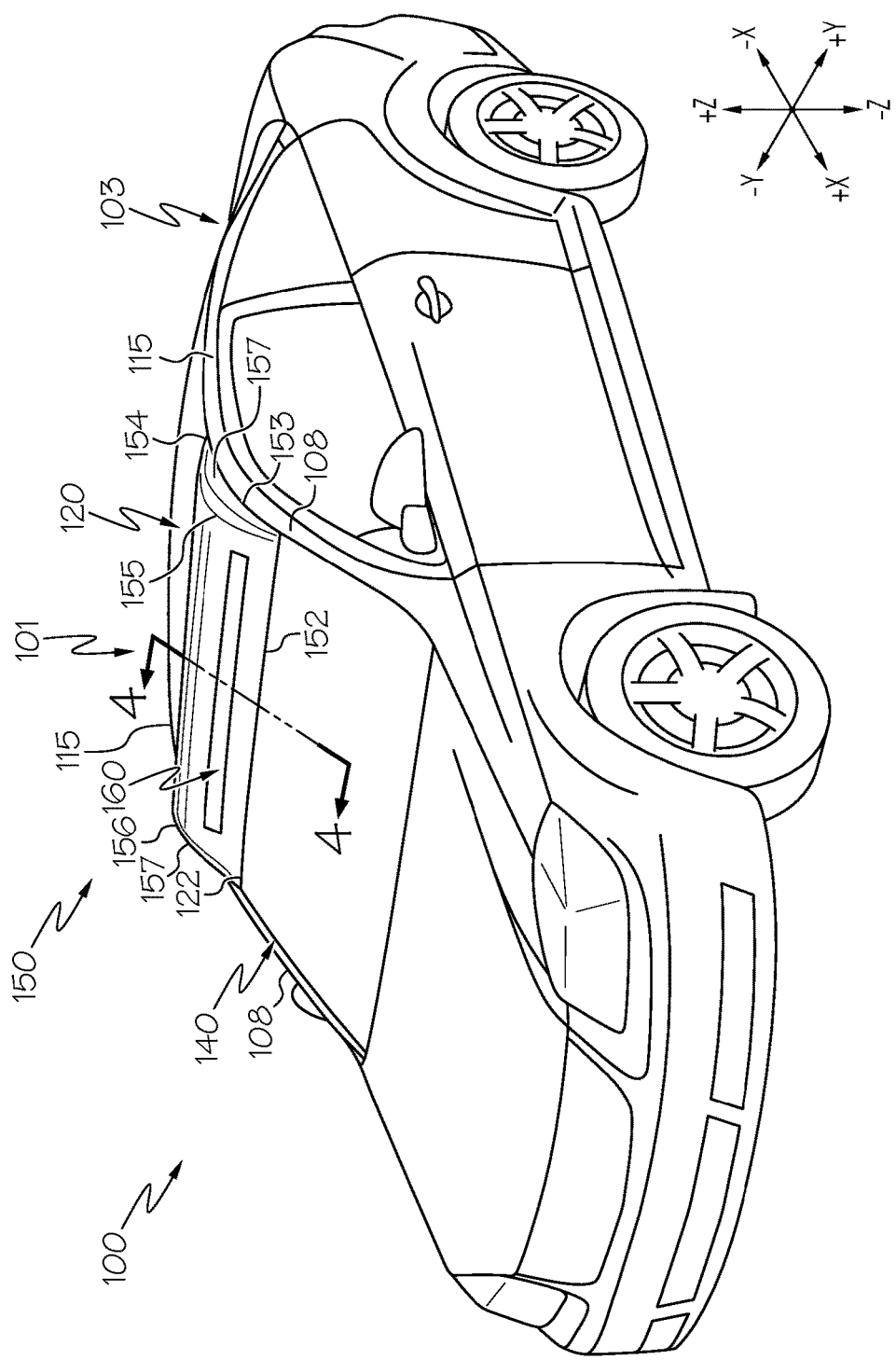
FIG. 1 schematically depicts a perspective view of a vehicle with a spoiler for concealing one or more sensors, according to one or more embodiments shown and described herein.

FIG. 1 generally depicts one or more embodiments of a vehicle having a vehicle roof structure for concealing one or more sensors therein. The vehicle roof structure generally includes a windshield, a roof panel, and a spoiler. Various embodiments of the vehicle will be described in more detail herein.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted).

Referring now to the drawings, FIG. 1 depicts an embodiment of a vehicle 100 that includes a vehicle roof structure 101 for concealing one or more sensors therein. The vehicle roof structure 101 may include a windshield 140, front pillars 108, a roof panel 120, side rails 115, and a spoiler 150. It is noted that while the vehicle 100 is depicted as an automobile, the vehicle 100 may be any passenger vehicle such as, for example, a terrestrial, aquatic, and/or airborne vehicle. In some embodiments, the vehicle 100 may be an autonomous vehicle.

Figure 2:
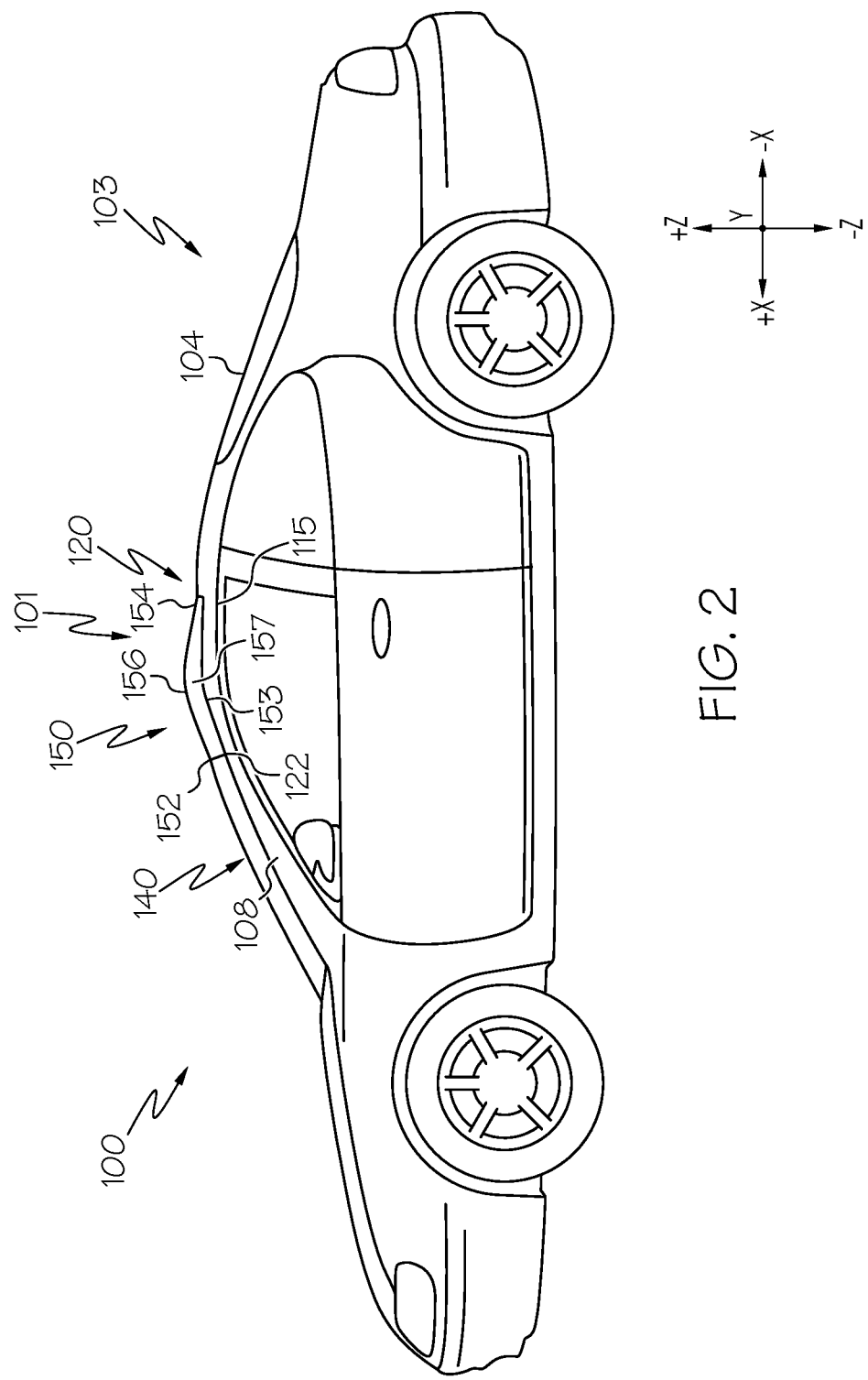
FIG. 2 schematically depicts a side view of the vehicle of FIG. 1, according to one or more embodiments shown and described herein.

The windshield 140 extends between the front pillars 108 of the vehicle 100 in the vehicle lateral direction and up to the roof panel 120 in the vehicle vertical direction. Referring also to FIG. 2, the windshield 140 may be generally angled, along with the front pillars 108, from the vehicle vertical direction toward the rear of the vehicle 100 in the vehicle longitudinal direction. Together the windshield 140 and front pillars 108 may curve from their generally angled orientation to blend with the roof panel 120 along the line at which the windshield 140 meets the roof panel 120 of the vehicle. The line at which the windshield 140 meets the roof panel 120 of the vehicle 100 is referred to herein as the windshield-roof-interface 122. The windshield 140 may be made of conventional windshield materials. For example and not as a limitation, the windshield 140 may be laminated glass, wherein an interlayer of polyvinyl butyral or ethylene-vinyl acetate, for example, is disposed between two or more layers of glass.

The windshield-roof-interface 122 extends across the vehicle 100 in the vehicle lateral direction between the side rails 115. The side rails 115 extend from the front pillars 108 in the vehicle longitudinal direction towards the rear of the vehicle 100. The side rails 115 and the windshield-roof-interface 122 generally define the boundaries of the roof panel 120.

The roof panel 120 extends from the windshield-roof-interface 122 rearward of the windshield 140 in the vehicle longitudinal direction and between the side rails 115 in the vehicle lateral direction to a rear window 104. The roof panel 120 may generally be made of any suitable material for use with a vehicle including, without limitation sheet metal, polymeric materials, composite materials, glass or the like and may be supported by various components of the vehicle roof structure 101.

Figure 4:
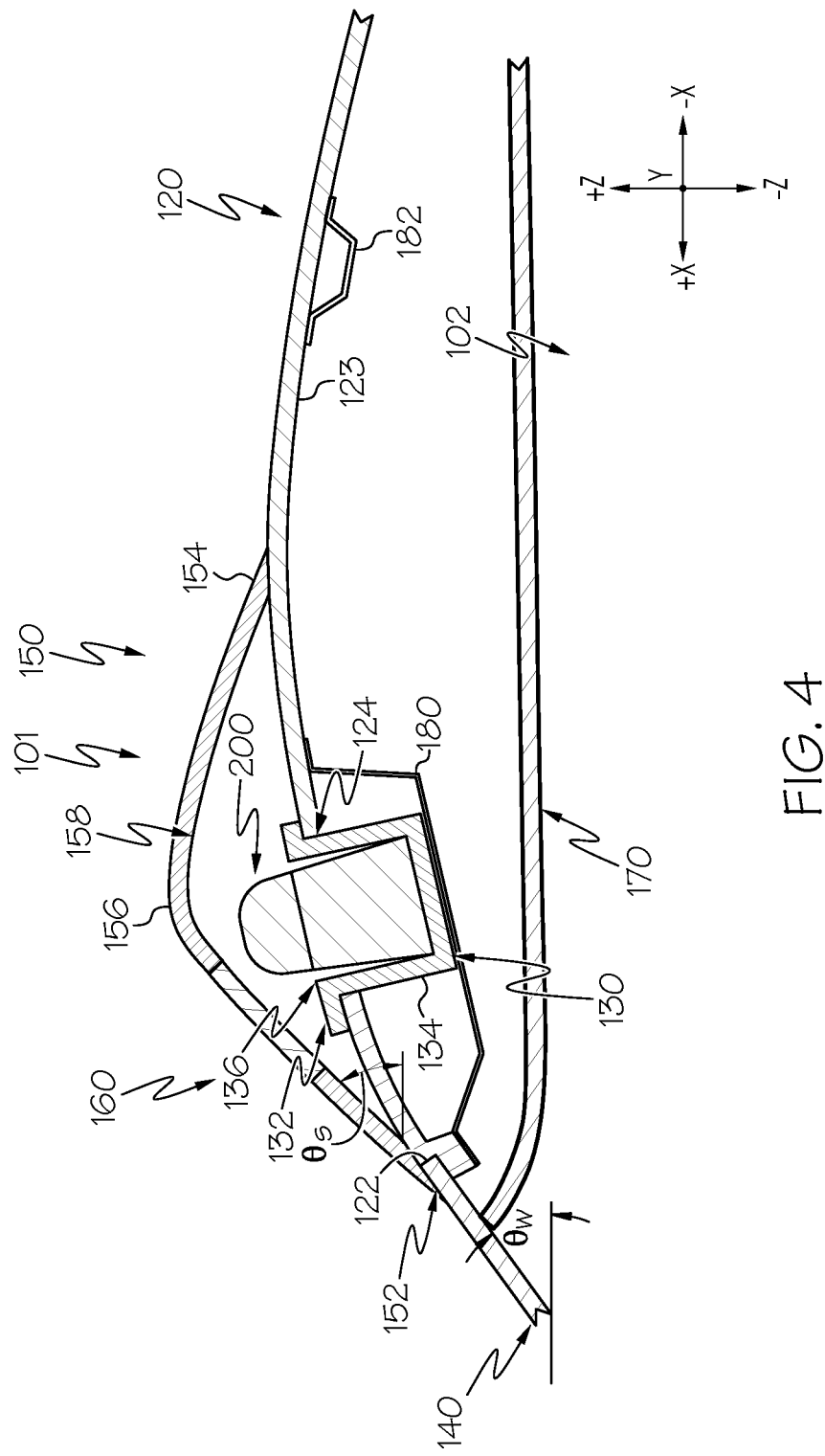
FIG. 4 schematically depicts a cross-sectional view of the vehicle roof structure of the vehicle of FIG. 1 indicated by 4-4, according to one or more embodiments shown and described herein.

Referring briefly to FIG. 4, an example cross-sectional view of the vehicle roof structure 101 of the vehicle 100 of FIG. 1 is schematically depicted. As shown, the roof panel 120 is supported within the vehicle roof structure 101 by a front header 180. The roof panel 120 may further be supported by one or more roof bows 182. Though not shown, the front header 180 and the one or more roof bows 182 extend in the vehicle lateral direction to connect to a portion of a frame of the vehicle 100 (e.g., side rails 115) to support the roof panel 120. The roof panel 120 may be adhered to the front header 180 and one or more roof bows 182 by mastic or other adhesives. The roof panel 120 may also be welded to the front header 180 in a discrete location.

Figure 3:
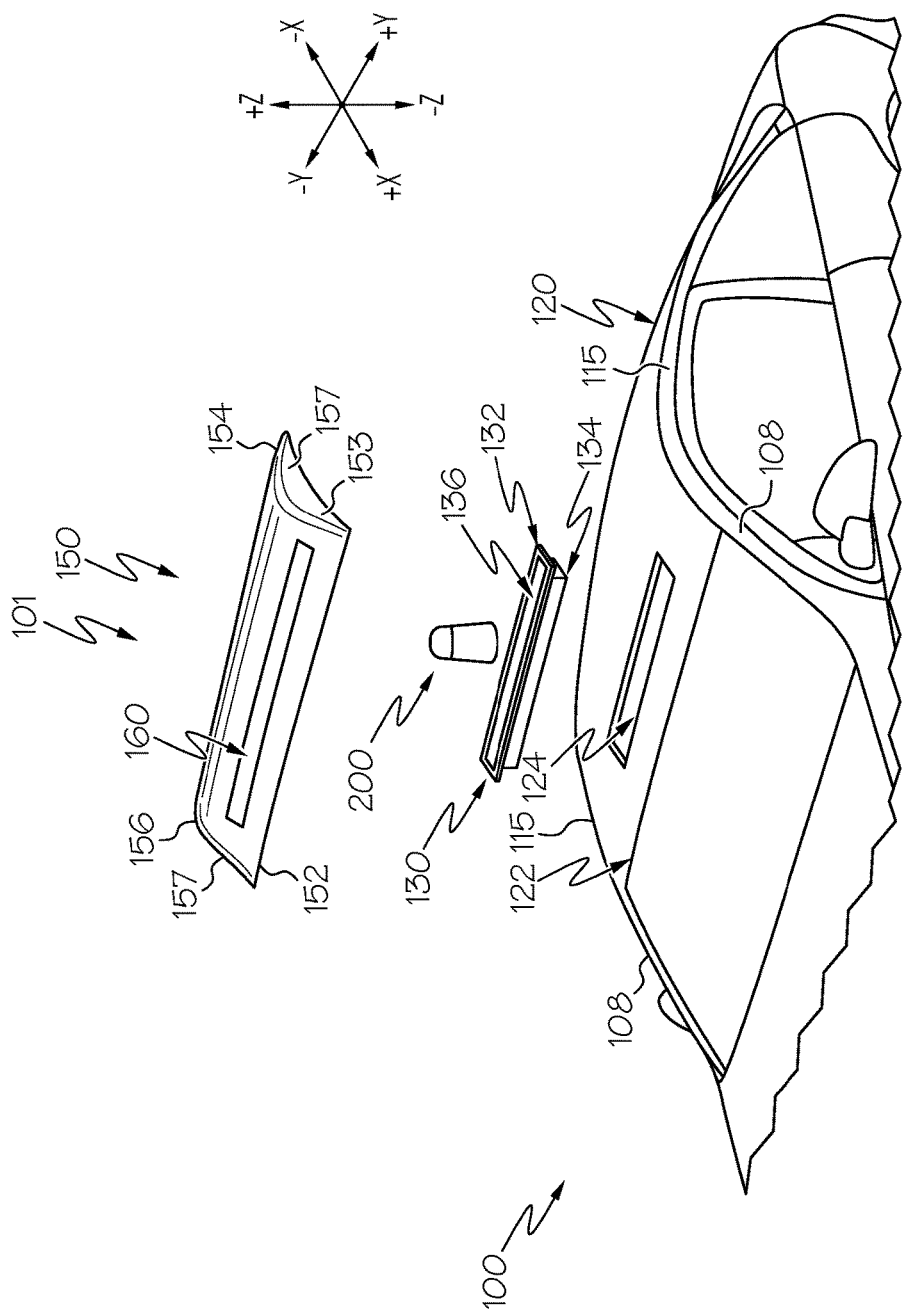
FIG. 3 schematically depicts a partial exploded view of a roof structure of the vehicle of FIG. 1, according to one or more embodiments shown and described herein.

Referring now to FIG. 3, an exploded view of the vehicle roof structure 101 is depicted. The roof panel 120, in some embodiments, has a channel 124 formed therein. In embodiments, the channel 124 may be sized and shaped to receive one or more sensors 200, a receptacle 130, or a combination of the one or more sensors 200 and the receptacle 130 therein. Such will be described in greater detail herein. Referring also to FIG. 4, the channel 124, as illustrated, extends through the thickness of the roof panel 120 in the vehicle vertical direction. The channel 124 may have variety of sizes and shapes depending on the application. For example, in some embodiments the channel 124 may be a plurality of channels 124 spaced across the width of the roof panel 120 in the vehicle lateral direction. In other embodiments, there may be a single channel 124 formed in the roof panel 120. In some embodiments, the channel 124 may extend across the entire width of the roof panel 120 in the vehicle lateral direction. In other embodiments, the channel 124 may extend across only a portion of the width of the roof panel 120. The channel 124 is illustrated as being positioned over the front header 180. However, it is contemplated that the channel 124 may be positioned at other positions along the roof panel 120. For example, and without limitation, the channel 124 may be positioned rearward of the front header 180 toward the rear 103 of the vehicle 100. It is further contemplated that some embodiments may not include a channel 124.

Referring now to FIGS. 1-4, the vehicle roof structure 101 further includes a spoiler 150. The spoiler 150 is disposed over the channel 124 and encloses a sensor volume 158 between the spoiler 150 and the roof panel 120, as shown in FIG. 4, to conceal the one or more sensors 200 therein. The spoiler 150 may generally include a leading portion 152, an apex 156, a trailing portion 154, and outboard faces 157.

Referring specifically to FIG. 1, the spoiler 150 may extend laterally across the roof panel 120 between the side rails 115. In some embodiments, the spoiler 150 may extend beyond the roof panel 120 in the vehicle lateral direction to blend with the side rails 115. In other embodiments, the spoiler 150 may only extend across a portion of the roof panel 120 such that the side rails 115 and the outboard faces 157 of the spoiler 150 are spaced apart from one another in the vehicle lateral direction.

The leading portion 152 of the spoiler 150 is generally indicated as being the front or leading edge of the spoiler 150 extending across the roof panel 120 in the vehicle lateral direction. The leading portion 152 of the spoiler 150 may extend laterally across the roof panel 120 at an orientation that is substantially parallel to the windshield-roof interface 122. In other embodiments, the leading portion 152 may not be substantially parallel to the windshield-roof interface 122. Referring now to FIG. 4, a cross-sectional view of the vehicle roof structure 101 is schematically depicted. The leading portion 152 is illustrated as being positioned over, and substantially obscuring the windshield-roof-interface 122 of the vehicle roof structure 101, such that the spoiler 150 extends from the windshield roof interface 122. In other embodiments, it is contemplated that the leading portion 152 need not be positioned directly over the windshield-roof-interface 122, but only adjacent thereto. In some embodiments, the leading portion 152 may be positioned rearward of the windshield-roof-interface 122 in the vehicle longitudinal direction.

In embodiments, the spoiler 150 extends from the leading portion 152 to a highest point of the spoiler 150, the apex 156. The height of the spoiler 150 may increase from a height of the roof panel 120, or a height of the windshield-roof interface 122, to a height of the apex 156 as the spoiler 150 extends from the leading portion 152 to the apex 156 in the vehicle longitudinal direction. The spoiler 150 may have, between the leading portion 152 and the apex 156, a generally linear configuration, or, in other embodiments, a contoured configuration. For example, the spoiler 150 may be curved between the leading portion 152 and the apex 156 to improve the aerodynamics of the vehicle 100. In the illustrated embodiment, the spoiler 150 extends from the windshield-roof-interface 122 at an angle, $\theta_s$, relative to the x-y plane to the apex 156. The angle, $\theta_s$, at which the spoiler 150 extends from the windshield-roof-interface 122 may be substantially equal to an angle, $\theta_w$, of the windshield 140. In other embodiments, the spoiler 150 extends from the windshield-roof-interface 122 at an angle, $\theta_s$, that is different than the angle, $\theta_w$, of the windshield 140. It is noted that the distance from the leading portion 152 to the apex 156 in the vehicle vertical direction, may be dependent on the specific application and type of sensor(s) housed within the sensor volume 158.

As described herein, the apex 156 may be the highest point of the spoiler 150 in the vehicle vertical direction. It is noted that in some embodiments, and as illustrated in the figures, the apex 156 has a substantially constant height throughout the width of the spoiler 150 in the vehicle lateral direction. However, in some embodiments, it is contemplated that the height of the apex 156 may vary along the width of the spoiler 150 in the vehicle lateral direction. The apex 156 may have a rounded or angular configuration, examples of which are illustrated in FIGS. 5A-5E.

From the apex 156, the trailing portion 154 of the spoiler 150 extends to the roof panel 120. The trailing portion 154 of the spoiler 150 generally refers to the portion of the spoiler 150 extending from the apex 156 to the roof panel 120. As such, from the apex 156 through the trailing portion 154, the height of the spoiler 150 may decrease to a height of the roof panel 120. In some embodiments, the decrease in height may be abrupt. In other embodiments, the decrease in height may be more gradual. For example, the trailing portion 154 of the spoiler 150 may be contoured to smoothly transition into and substantially blend with the roof panel 120 in a visually appealing manner.

Figure 5A:
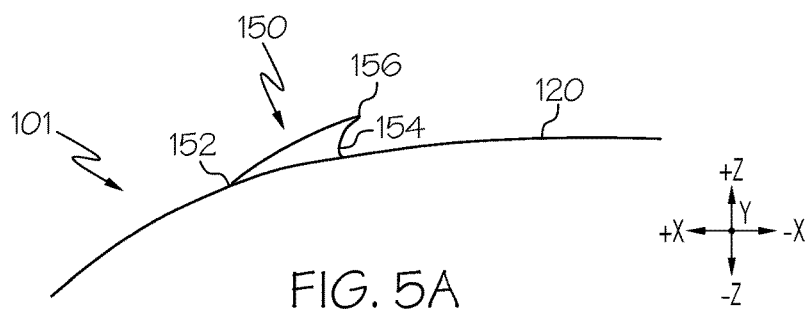
FIGS. 5A-5E schematically depict several example side profiles of spoilers, according to one or more embodiments shown and described herein.
Figure 5B:
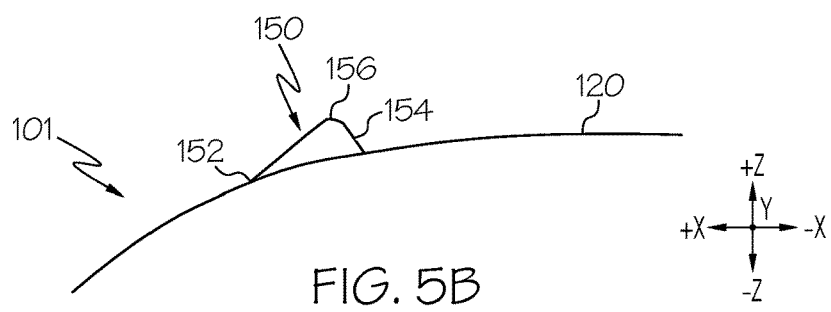

FIGS. 5A-5E schematically illustrate various non-limiting side profiles of the spoiler 150 according to the various embodiments described herein. In each of the embodiments, the spoiler 150 extends from the leading portion 152 to the apex 156 in either a generally linear configuration (e.g., FIGS. 5B and 5E) or a generally contoured configuration (e.g., FIGS. 5A, 5C, and 5D). The apex 156, in the various embodiments, is illustrated as having an angular configuration (e.g., FIGS. 5A, 5B, and 5E) or rounded configuration (e.g., FIGS. 5C and 5D). In particular the apex 156 illustrated in FIG. 5B is chamfered, which may provide improved aerodynamics to the vehicle 100.

Figure 5C:
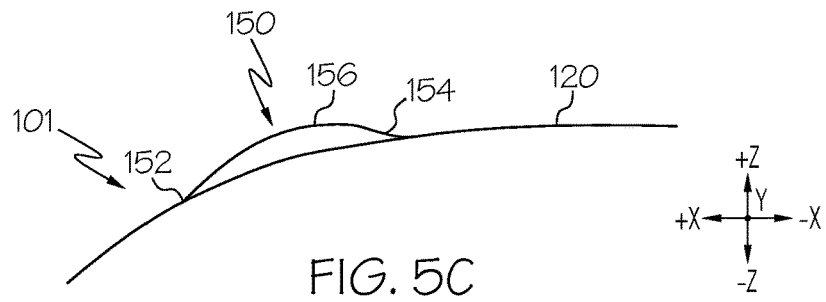
Figure 5D:
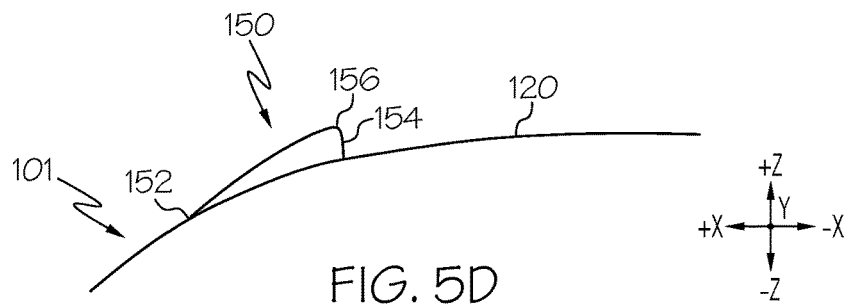
Figure 5E:
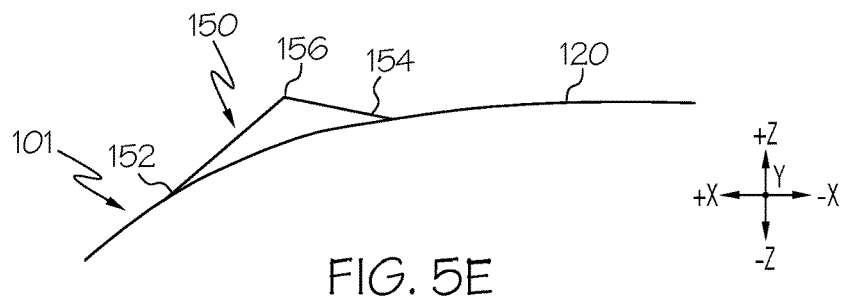

The trailing portion 154 may also have a variety of configurations. For example, in FIG. 5A, the trailing portion 154 is illustrated as extending under at least a portion of the spoiler 150 toward the leading portion 152. In this embodiment, the portion of the spoiler 150 containing the apex 156 appears as an acute angle. In other embodiments, the height of the spoiler 150 gradually decreases from the height of the apex 156 to the height of the roof panel 120 as the spoiler 150 extends toward the rear 103 of the vehicle 100 in the vehicle lateral direction. As such the trailing portion 154 may have a generally linear configuration (e.g. FIGS. 5B and 5E) or a contoured configuration (e.g., FIG. 5C). Specifically, FIG. 5C illustrates an embodiment wherein the whole of the spoiler 150 is contoured, from the leading portion 152 to through the trailing portion 154, such that the spoiler 150 appears to be a smooth bump on the roof 120 of the vehicle 100. In yet further embodiments, and as illustrated in FIG. 5D, the trailing portion 154 may extend from the apex 156 to the roof panel 120 abruptly, such that the trailing portion 154 intersects the roof panel 120 at a substantially vertical orientation.

Referring again to FIG. 4, as described herein, the sensor volume 158 may generally be defined as the space formed between the spoiler 150 and the roof panel 120. The sensor volume 158 may provide a space having a height sufficient to enclose the one or more sensors 200 therein. Because of differences in the size of the various sensors 200 that may be included in the vehicle roof structure 101, the height of the spoiler 150 at its apex 156 may be different depending on the specific application. For example, LiDAR sensors, in some cases, can be very large, while optical sensors, such as cameras, may be very small. Therefore, in embodiments where a LiDAR sensor is included in the one or more sensors 200, the height of the apex 156 of the spoiler 150 may be significantly larger than embodiments wherein only smaller sensors, such as some optical sensors (e.g., cameras), are used.

Referring again to FIG. 2, the spoiler 150 may terminate in the vehicle lateral direction at outboard faces 157. In some embodiments, the outboard faces 157 may include a side edge 153 extending in the vehicle longitudinal direction. In embodiments, the side edge 153 of the outboard face 157 intersects with the side rail 115 and may be contoured to conform to the curvature of the side rail 115. Hence, when the spoiler 150 is mounted on to the roof panel 120 of the vehicle 100, the spoiler 150 may generally conform to the contours of the vehicle 100, such that the transitions between the spoiler 150, and the roof panel 120, are smooth and visually appealing.

Referring again to FIG. 1, the spoiler 150 may also include one or more sensor windows 160. The sensor window 160 may be directed toward the front of the vehicle 100 in the vehicle longitudinal direction and extend transversely across the spoiler 150 in the vehicle lateral direction. In some embodiments, the sensor window 160 may extend across an entire width of the spoiler 150. In other embodiments, the sensor window 160 may extend across only a portion of the width of the spoiler 150. The sensor window 160, as will be described in greater detail herein, may be constructed of a material which is transparent to the one or more sensors 200, thereby allowing the one or more sensors 200 to detect a characteristic of the environment of the vehicle 100 through the sensor window 160. For example and not as a limitation, if the one or more sensors 200 concealed within the vehicle roof structure 101 includes a camera, the camera must be able to capture image data through the sensor window 160. In such a case, glass, or other optically transparent materials, would be an appropriate material for the sensor window 160. The sensor window 160 in some embodiments may be tinted to limit visibility into the sensor volume 158 from an exterior of the vehicle 100.

As described above, in some embodiments, the sensor window 160 may extend across the spoiler 150 in the vehicle lateral direction. For example, the sensor window 160 may be a single window that at least partially extends across the width of the spoiler 150. In other embodiments, the sensor window 160 includes a plurality of sensor windows 160 spaced across the width of the spoiler 150 in the vehicle lateral direction. Though the sensor window 160 is described as being oriented toward the front of the vehicle 100 in the vehicle longitudinal direction, it is also contemplated that a sensor window 160 of the spoiler 150 may be oriented toward other vehicle directions. For example, it is contemplated that the outboard faces 157 of the spoiler 150 may also include sensor windows 160. In yet further embodiments, a sensor window 160 may be directed toward the rear of the vehicle 100 in the vehicle longitudinal direction. It is also contemplated that in some embodiments, the sensor window 160 may be removable. In yet further embodiments, the spoiler 150 may not include any sensor windows 160 but, instead, the entire spoiler 150 may be made of a material that is transparent to the one or more sensors 200 housed beneath the spoiler 150.

The spoiler 150, as depicted in FIGS. 1 and 2, is coupled to the roof panel 120. The spoiler 150 may be coupled to the roof panel 120 through any conventional methods. For example, and not as a limitation, the spoiler 150 may be secured to the roof panel 120 by any suitable securing techniques, including, but not limited to, the use of adhesives, fasteners (e.g., clips, threaded fasteners, and the like), magnets, and welding. Furthermore, the spoiler 150 may be formed from a variety of materials including, for example and without limitation, metals, plastics, composites, glass, and the like, and may be formed by any suitable method or combination of methods such as stamping, forming, machining, and the like. It is also noted that the spoiler 150 may be coupled the roof panel 120 such that the vehicle roof structure 101 is water-tight. For example, the spoiler 150 may be sealed to the roof panel 120 such that water or other environmental debris may not enter the vehicle 100 between the spoiler 150 and the roof panel 120. As such a sealing material may be disposed between the spoiler 150 and the roof panel 120 and may include, but is not limited to, foam, an integrated rubber seal, a secondary rubber seal, etc.

Referring again to FIG. 3, an exploded view of the vehicle roof structure 101 of the vehicle 100 is schematically depicted. FIG. 3 illustrates that the vehicle roof structure 101 may further include a receptacle 130 and one or more sensors 200, in addition to the windshield 140, the roof panel 120, and the spoiler 150.

The receptacle 130 is any device capable of mounting the one or more sensors 200 under the spoiler 150, such that the one or more sensors 200 are at least partially disposed within the sensor volume 158. The receptacle 130, in some embodiments, is a structure that is couplable to at least one of the several components of the roof structure 101 described herein. In other embodiments, the receptacle 130 is formed integrally with one of the several components of the vehicle roof structure 101 such that the receptacle 130 is part of one of the several components of the vehicle roof structure 101. For example, the receptacle 130 may be formed integrally with the roof panel 120 or the spoiler 150. It is noted that in some embodiments there may be no receptacle 130. In such embodiments, the one or more sensors 200 may be directly coupled to at least one of the several components of the vehicle roof structure 101. Furthermore, the receptacle may be coupled to roof panel 120, or other vehicle roof structure 101 components, such that a seal between the roof panel 120, or other vehicle roof structure 101 components, and the receptacle 130 is water-tight. For example, the receptacle 130 may be sealed to the roof panel 120 such that water or other environmental debris may not enter the vehicle 100 between the receptacle 130 and the roof panel 120. As such a sealing material may be disposed between the receptacle 130 and the roof panel 120 and may include, but is not limited to, foam, an integrated rubber seal, a secondary rubber seal, etc.

Referring to FIG. 4, in embodiments having a receptacle 130, the receptacle 130 has a body 134 that provides a sensor receiving volume 136, wherein the one or more sensors 200 may be positioned and secured thereto. As such, the body 134 may be substantially hollow, such that a sensor receiving volume 136 is formed therein. The one or more sensors 200 may be coupled to the receptacle 130 to restrict motion of the one or more sensors 200 relative to the spoiler 150. In some embodiments, the one or more sensors 200 are positioned within the sensor receiving volume 136 of the receptacle 130 and extend above the roof panel 120. The one or more sensors 200 may be coupled to the receptacle 130 through a variety of joining techniques including, but not limited to mechanical fasteners and structural adhesives. In some embodiments, the receptacle 130 may have a molded body sized and shaped to receive a specific type of sensor therein, such that the specific type of sensor is nestled into the contours of the molded body of the receptacle 130.

In embodiments wherein the roof panel 120 has a channel 124 positioned therein, the body 134 of the receptacle 130 may be sized to be inserted into the channel 124 of the roof panel 120. In other embodiments, the body 134 of the receptacle 130 may be sized to be coupled to the interior portion 123 of the roof panel 120 around the channel 124 of the roof panel 120. It is noted that the channel 124 provides additional space for mounting the one or more sensors 200 beneath the spoiler 150. Such additional space may allow the height of the apex 156 to be kept closer to the height of the roof panel 120 and may provide improved aerodynamics and may be aesthetically pleasing. In yet further embodiments, there may not be a channel 124, and the receptacle 130 is simply coupled to a surface of the roof panel 120. It is noted that, though the channel 124 and the body 134 of the receptacle 130 are illustrated as having rectangular shapes, as indicated in FIG. 3, other configurations are contemplated and possible. Specifically, the channel 124 and the body 134 of the receptacle 130 may have any geometric shape capable of receiving one or more sensors 200. In some embodiments, the channel 124 of the roof panel 120 and the receptacle 130 may have differing geometric shapes.

The receptacle 130 may have a variety of configurations depending on the specific application. For example, and not as a limitation, the receptacle 130 may be a plurality of receptacles 130 spaced across the width of the roof panel 120 in the vehicle lateral direction. In other embodiments, there may only be a single receptacle 130 that extends across the width of the roof panel 120 in the vehicle lateral direction. In such embodiments, wherein the vehicle roof structure 101 includes a plurality of receptacles 130, there may or may not also be a plurality of channels 124 in the roof panel 120 to correspond to the number of receptacles 130.

In some embodiments, the body 134 of the receptacle 130 may also be configured to position or tilt the one or more sensors 200 relative to the sensor window 160 of the spoiler 150 when the one or more sensors 200 are placed within the sensor receiving volume 136 of the receptacle 130. By positioning or tilting the one or more sensors 200 toward the sensor window 160, the one or more sensors 200 may be better able detect a characteristic of the environment of the vehicle 100 through the sensor window 160.

Referring to FIG. 4, as described herein, the receptacle 130 may be coupled to the roof panel 120 of the vehicle 100. In some embodiments, the receptacle 130 may be aligned with and coupled to the channel 124. The receptacle 130 may be sized to be at least partially inserted into the channel 124, from either outside of the vehicle 100 or from an interior of the vehicle 100, and to extend along the channel 124 in the vehicle lateral direction. In other embodiments, the receptacle 130 is coupled to the channel 124 by being coupled to an interior portion 123 of the roof panel 120 surrounding the channel 124. In FIG. 4, the receptacle 130 is illustrated as being positioned within the channel 124. In such embodiments, the receptacle 130 may also include a flange 132 that extends from a perimeter of the body 134 of the receptacle 130. The flange 132 may be larger than a width of the channel 124 of the roof panel 120 in the vehicle longitudinal direction and/or the vehicle lateral direction. As noted herein, the receptacle 130 may not include a flange 132 and may instead be integrally formed within the roof panel 120. In such example, the receptacle 130 is a pocket formed within the roof panel. In such embodiments, there may or may not be a channel 124 formed within a bottom of the receptacle 130.

In embodiments wherein the body 134 of the receptacle 130 is placed within the channel 124, the flange 132 may contact the roof panel 120 surrounding the channel 124, as depicted in FIG. 4. In other embodiments, the flange 132 may contact the interior portion 123 of the roof panel 120 around the channel 124. In yet further embodiments, there is no channel 124, and the receptacle 130 is coupled directly to a surface the roof panel 120. The receptacle 130 may be permanently or impermanently coupled to the roof panel 120 through any coupling techniques, including, but not limited to, welding, brazing, mechanical fasteners, structural adhesives, and or magnets. The body 134 of the receptacle 130 may extend below the interior portion 123 of the roof panel 120 in the direction of a headliner 170 of the vehicle 100.

The headliner 170 extends along an interior portion 123 of the roof panel 120 and substantially conceals the interior portion 123 of the roof panel 120 from a passenger cabin 102 of the vehicle 100. The headliner 170 may be any material capable of concealing the interior portion 123 of the roof panel 120 from the passenger cabin 102. By way of example, and not as a limitation, the headliner 170 may be made of fabrics, plastics, composites, and combinations thereof. The headliner 170 may be spaced apart from the interior portion 123 of the roof panel 120 a distance greater than or equal to a distance that the receptacle 130 and/or the one or more sensors 200 extends below the interior portion 123 of the roof panel 120. In this way, the receptacle 130 and/or the one or more sensors 200 may be concealed from view from the passenger compartment 102 of the vehicle 100.

It is noted that it may be desirable to couple the receptacle 130 to other structural components of the vehicle roof structure 101 than the roof panel 120. As such, in some embodiments, in addition or in alternative to coupling the receptacle 130 to the roof panel 120 of the vehicle 100, the receptacle 130 may be coupled to the front header 180 beneath the channel 124. In embodiments wherein the channel 124 is rearward of the front header 180, the receptacle 130 may be coupled to the one or more cross bows 182. In either case, the sensor receiving volume 136 of the receptacle 130, is positioned relative to the channel 124, such that when the one or more sensors 200 are coupled to the sensor receiving volume 136 of the receptacle 130, the one or more sensors 200 may extend from the receptacle 130 and through the channel 124, such that at least a portion of the one or more sensors 200 is positioned within the sensor volume 158.

Referring to FIG. 6, an alternative cross sectional view of a vehicle roof structure 101 is illustrated. In this embodiment, the receptacle 130 is not coupled to the roof panel 120 or other structural components of the roof structure 101, but is instead coupled to the spoiler 150. The receptacle 130 includes a body 134 having a sensor receiving volume 136 to receive one or more sensors 200. A flange 132 extends from the body 134 at an opening to the sensor receiving volume 136. The receptacle 130 is coupled to the spoiler 150 at attachment points 135. The receptacle 130 may be coupled to the attachment points 135 through any conventional attachment means including, but not limited to, mechanical fasteners, structural adhesives, and welding/brazing techniques. The attachment points 135 may be located to either side of the sensor window 160 such that the receptacle 130 is oriented toward the sensor window 160. In some embodiments, there may be no attachment points 135 or flange 132. Instead, the receptacle 130 may be formed integrally with the spoiler 150. In some embodiments, the receptacle 130 may extends at least partially through the channel 124. In other embodiments, there may be no channel 124.

The receptacle 130 may be formed of a variety of materials, including, for example and without limitation, metals, composites, plastics, and the like, and may be formed by any suitable method or combination of methods such as stamping, forming, machining, molding, or the like. It is contemplated that in some embodiments, the flange 132 may have a rubber material applied thereto to provide cushioning between the flange 132 and the roof panel 120 or other components of the vehicle roof structure 101. Such rubber, or other cushioning materials, may prevent damage to the roof panel 120 or other components of the vehicle roof structure 101 and reduce noise created between the receptacle 130 and the roof panel 120 or other components of the vehicle roof structure 101 from vibrations of the vehicle 100 when the vehicle 100 is in motion.

As noted herein, in some embodiments, there may be no receptacle 130. In such embodiments, the one or more sensors 200 may be directly coupled to one or more of the components of the vehicle roof structure 101 including, but not limited to, the roof panel 120, the front header 180, the one or more roof bows 182, and the spoiler 150. In embodiments wherein the one or more sensors 200 are directly coupled to the roof panel 120, the roof panel 120 may be configured to direct the one or more sensors toward the sensor window 160.

As described herein, the sensor volume 158 may generally be defined as the space formed between the spoiler 150 and the roof panel 120. The sensor volume 158 provides additional space to mount the one or more sensors 200 therein, such that the one or more sensors are generally concealed in a visually appealing fashion.

The one or more sensors 200 may include a variety of sensors, and in some embodiments, the one or more sensors 200 are a plurality of sensors 200. For instance, the one or more sensors 200 may be at least one of a LiDAR sensor, vehicle-to-vehicle communication, an optical sensor, a radar sensor, and a laser sensor. The one or more sensors 200 may provide a variety of environmental information to the vehicle 100 to allow the vehicle 100 to react in response to the signal provided by the one or more sensors 200.

Referring again to FIG. 4, the one or more sensors 200 may be positioned within the receptacle 130 and secured thereto. The receptacle 130 is illustrated as being disposed within the channel 124 such that the flange 132 is supported on the roof panel 120 surrounding the channel 124. Referring now to FIG. 6, the one or more sensors 200 are illustrated as being positioned within the receptacle 130 and secured thereto, but, in this embodiment, the receptacle 130 is coupled to the spoiler 150, such that the one or more sensors 200 are directed toward the sensor window 160. As described herein, in some embodiments, there is no receptacle 130 and the one or more sensors 200 are coupled directly to the roof panel 120. Moreover, it is noted that it may be desirable to couple the one or more sensors 200 to other structural components of the vehicle roof structure 101 than the roof panel 120. FIG. 4 illustrates additional structural components of the vehicle roof structure 101. For example, and not as a limitation, in addition or in alternative to coupling the one or more sensors 200 to the roof panel 120 of the vehicle 100, the one or more sensors 200 may be coupled to the front header 180 beneath the channel 124. In embodiments wherein the channel 124 is rearward of the front header 180, the one or more sensors may be coupled to the one or more cross bows 182. In either case, the one or more sensors of the receptacle 130, may be positioned relative to the channel 124, such that when the one or more sensors 200 are secured beneath of the spoiler 150, the one or more sensors 200 extend through the channel 124, such that at least a portion of the one or more sensors 200 is positioned within the sensor volume 158. Furthermore, it is noted that in embodiments having no channel 124 or receptacle 130, the one or more sensors 200 may be coupled directly to the roof panel 120 and the roof panel 120 may be formed to direct the one or more sensors 200 toward the sensor window 160.

As described herein, the one or more sensors 200 are capable of detecting a characteristic of the environment through the sensor window 160 of the spoiler 150. The one or more sensors 200 may output a signal indicative of the characteristic of the environment detected through the sensor window 160. In embodiments wherein the sensor window 160 is oriented toward the front of the vehicle 100 in the vehicle longitudinal direction, the one or more sensors 200 output a signal indicative of the characteristic of the environment detected in a substantially forward direction of the vehicle 100. Examples are described in more detail below.

Figure 7:
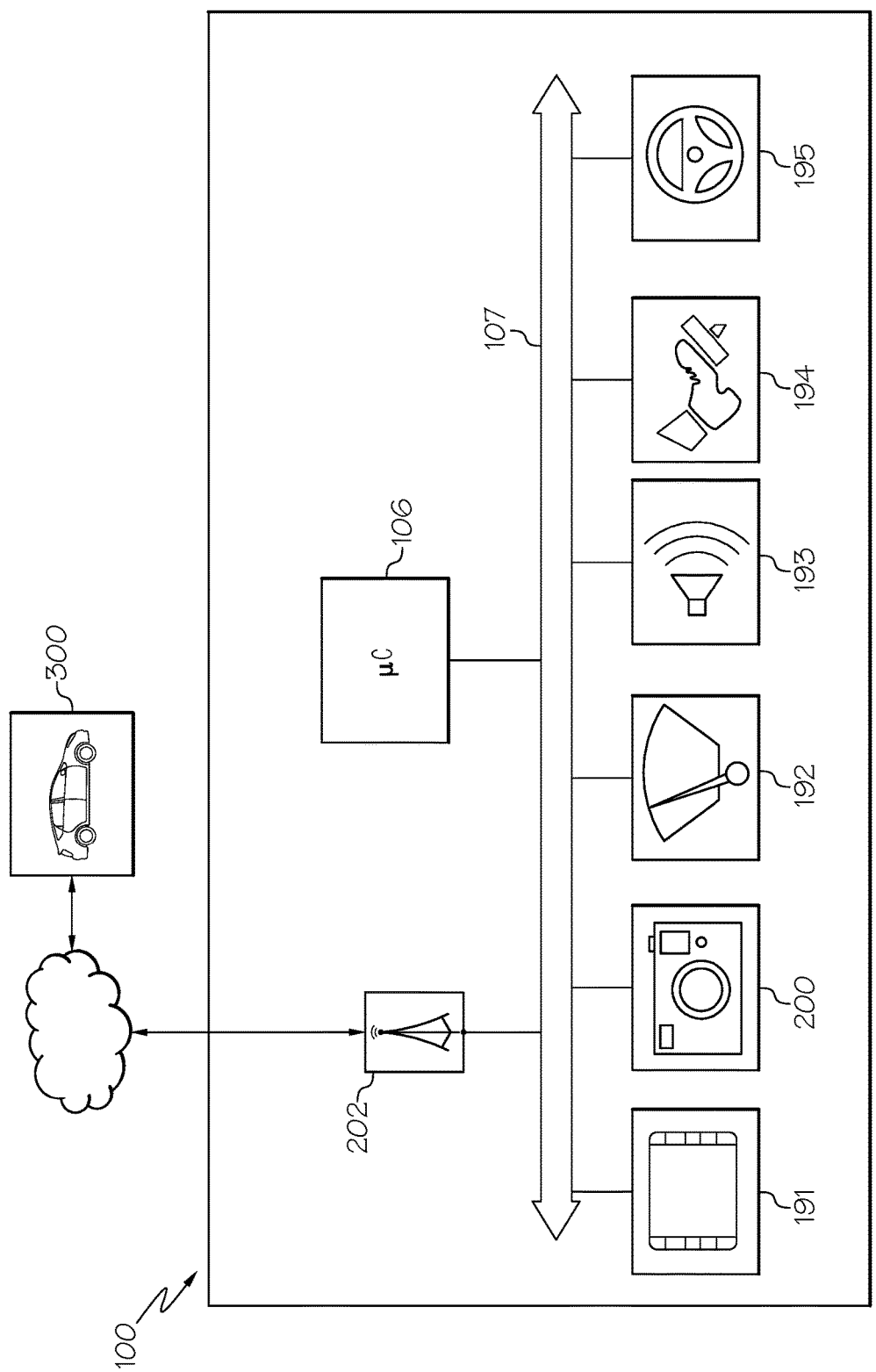
FIG. 7 schematically depicts one or more processors of the vehicle of FIG. 1 communicatively coupled to one or more sensors and vehicle systems according to one or more embodiments shown and described herein.

As discussed above, the one or more sensors 200 are configured to produce a signal indicative of a characteristic of an environment of the vehicle 100 detected by the one or more sensors 200 through the sensor window 160. The signal produced by the one or more sensors 200 may be communicatively coupled to different vehicle 100 components to cause the vehicle 100 to respond to the signal. Referring to FIG. 7 by way of example, the vehicle 100 may include one or more processors 106 communicatively coupled to the one or more sensors 200.

The one or more processors 106 may include any device capable of executing machine-readable instructions stored on a non-transitory computer-readable medium. The one or more processors 106 may include a controller, an integrated circuit, a microchip, a computer, and/or any other computing device. The one or more processors 106 are coupled to a communication path 107 that provides signal interconnectivity between various components of the vehicle 100. Specifically, the communication path 107 provides signal interconnectivity between the one or more processors 106, the one or more sensors 200, and various modules of the vehicle 100. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 107 may be formed from any medium that is capable of transmitting a signal such as, for example, conductive wires, conductive traces, optical waveguides, or the like. In some embodiments, the communication path 107 may facilitate the transmission of wireless signals, such as WiFi, Bluetooth, and the like. Moreover, the communication path 107 may be formed from a combination of mediums capable of transmitting signals. In one embodiment, the communication path 107 comprises a combination of conductive traces, conductive wires, connectors, and buses that cooperate to permit the transmission of electrical data signals to components such as processors, memories, sensors, input devices, output devices, and communication devices. Accordingly, the communication path 107 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Embodiments of the present disclosure include logic that includes machine-readable instructions and/or an algorithm written in any programming language of any generation (e.g., 1GL, 2GL, 3GL, 4GL, and/or 5GL) such as, e.g., machine language that may be directly executed by the one or more processors 106, assembly language, object-oriented programming (OOP), scripting languages, microcode, etc., that may be compiled or assembled into machine readable instructions and stored on a machine readable medium. Similarly, the logic and/or algorithm may be written in a hardware description language (HDL), such as logic implemented via either a field-programmable gate array (FPGA) configuration or an application-specific integrated circuit (ASIC), and their equivalents. Accordingly, the logic may be implemented in any conventional computer programming language, as pre-programmed hardware elements, and/or as a combination of hardware and software components.

As described above, the one or more sensors 200 are communicatively coupled to the one or more processors 106 over the communication path 107. As described above, the one or more sensors 200 are operable to sense one or more characteristics of an environment of the vehicle 100 through the sensor window 160 of the spoiler 150. In general, the one or more sensors 200 may sense characteristics of the environment including, but not limited to, rain, navigational information, oncoming obstacles, potentially hazardous obstacles, and other vehicles. Based on information detected by the one or more sensors 200, the one or more processors 106 may execute machine readable instructions to cause the vehicle 100 to respond to the characteristic detected by the one or more sensors 200.

FIG. 7 illustrates a variety of non-limiting examples in which the one or more processors 106 may use the information from the one or more sensors 200. For instance, if the one or more sensors 200 detect rain, the one or more processors 106 may execute logic to cause windshield wipers 192 to turn on to wipe rain droplets from the windshield 140. In another example, the one or more sensors 200 may detect that an obstacle has entered the path of the vehicle 100, such as, for example, a pedestrian stepping in front of the path of the vehicle 100. In that case, the one or more processors 106 may execute logic to apply the brakes 194 of the vehicle 100, or in some cases the one or more processors 106 may execute logic to display a warning on one or more displays 191 of the vehicle 100. In some cases, the characteristic sensed by the environment may cause the one or more processors 106 to execute machine readable instructions to cause an audible warning be emitted by one or more speakers 193 of the vehicle 100. In yet another non-limiting example, the vehicle 100 is an autonomous vehicle and at least one of the one or more sensors 200 is a LiDAR sensor. In that case, the one or more processors 106 execute machine readable instructions to navigate the vehicle 100 autonomously 195.

As described herein, in some embodiments, vehicle-to-vehicle communication may be used in addition to or in place of the other sensors described herein. In such embodiments, the vehicle 100 includes network interface hardware 202 for communicatively coupling the one or more processors 106 to other vehicles 300 such that data may be received from and sent to other vehicles 300 configured with vehicle-to-vehicle communication. For instance, the vehicle 100 and other vehicles 300 may communicate with one another to send and receive information relevant to speed, road conditions, oncoming obstacles, etc. The network interface hardware 202 can be communicatively coupled to the communication path 107 and can be any device capable of transmitting and/or receiving data via a network. Accordingly, the network interface hardware 202 can include a communication transceiver for sending and/or receiving any wired or wireless communication. For example, the network interface hardware 202 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 202 includes hardware configured to operate in accordance with the Bluetooth wireless communication protocol. In another embodiment, network interface hardware 202 may include a Bluetooth send/receive module for sending and receiving Bluetooth communications to/from a mobile device. Some embodiments may not be configured with vehicle-to-vehicle communication and may therefore not include the network interface hardware 202.

It should now be apparent the vehicles and vehicle roof structures according to embodiments described herein allow for one or more sensors to be concealed within the vehicle roof structure of the vehicle. By concealing the one or more sensors within the vehicle roof structure, the sensors may remain largely hidden from view in a visually appealing manner. Furthermore, the sensors may be placed along higher points of the vehicle which may improve sensor function will preserving the visual appeal of the vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising a vehicle roof structure for concealing one or more sensors therein, the vehicle roof structure comprising:
    a roof panel;
    a windshield extending up to the roof panel;
    a spoiler extending across at least a portion of a width of the roof panel in a vehicle lateral direction, the spoiler comprising:
        a leading portion that is substantially parallel to a windshield-roof interface;
        an apex, wherein a height of the spoiler increases from a height of the roof panel to a height of the apex as the spoiler extends from the leading portion to the apex in a vehicle longitudinal direction; and
        a trailing portion extending from the apex to the roof panel, wherein a sensor volume is formed between the spoiler and the roof panel;
    one or more sensors at least partially positioned within the sensor volume, wherein the one or more sensors output a signal indicative of a characteristic of an environment of the vehicle; and
    a headliner, extending along an interior portion of the roof panel, wherein the headliner is spaced apart from an interior portion of the roof panel by a distance greater than or equal to a distance the one or more sensors extend below the interior portion of the roof panel.

2. The vehicle roof structure of claim 1, wherein:
    the spoiler further comprises one or more sensor windows; and
    the one or more sensors are oriented behind the one or more sensor windows.

3. The vehicle roof structure of claim 2, wherein the one or more sensors are tilted toward the one or more sensor windows.

4. The vehicle roof structure of claim 1, further comprising a receptacle for mounting the one or more sensors within the sensor volume, the receptacle comprising:
    a body; and
    a sensor receiving volume formed within the body, wherein the one or more sensors are mounted within the sensor receiving volume.

5. The vehicle roof structure of claim 4, wherein the receptacle is coupled to at least one of the roof panel and the spoiler.

6. The vehicle roof structure of claim 1, wherein the spoiler is constructed of a material that is transparent to the one or more sensors.

7. The vehicle roof structure of claim 1, wherein the one or more sensors comprise at least one of a LiDAR sensor, vehicle-to-vehicle communication, an optical sensor, a radar sensor, and a laser sensor.

8. A vehicle comprising a vehicle roof structure for concealing one or more sensors therein, the vehicle roof structure comprising:
    a roof panel;
    a windshield extending up to the roof panel;
    a headliner extending along an interior portion of the roof panel;
    a spoiler extending from a windshield-roof interface to an apex and from the apex towards a rear of the vehicle, a height of the spoiler decreasing to a height of the roof panel as the spoiler extends from the apex towards the rear of the vehicle in a vehicle longitudinal direction;
    a channel positioned in the roof panel beneath the spoiler; and
    one or more sensors at least partially positioned within the channel, wherein the one or more sensors output a signal indicative of a characteristic of an environment of the vehicle.

9. The vehicle roof structure of claim 8, wherein the headliner is spaced apart from the interior portion of the roof panel by a distance greater than or equal to a distance the one or more sensors extend below the interior portion of the roof panel.

10. The vehicle roof structure of claim 8, wherein the spoiler comprises a sensor window.

11. The vehicle roof structure of claim 10, wherein the one or more sensors are tilted toward the sensor window.

12. The vehicle roof structure of claim 8, wherein the spoiler is constructed of a material that is transparent to the one or more sensors.

13. The vehicle roof structure of claim 8, further comprising a front header, wherein the channel is positioned above the front header.

14. The vehicle roof structure of claim 8, wherein the one or more sensors comprise at least one of a LiDAR sensor, vehicle-to-vehicle communication, an optical sensor, a radar sensor, and a laser sensor.

15. A vehicle comprising a vehicle roof structure for concealing one or more sensors therein, the vehicle roof structure comprising:
a roof panel;
a windshield extending up to the roof panel;
a headliner extending along an interior portion of the roof panel;
a spoiler extending from a windshield-roof interface to an apex and from the apex towards a rear of the vehicle, a height of the spoiler decreasing to a height of the roof panel as the spoiler extends from the apex towards the rear of the vehicle in a vehicle longitudinal direction;
a channel positioned in the roof panel beneath the spoiler;
a receptacle coupled to the channel and extending toward the headliner; and
one or more sensors at least partially positioned within the receptacle, wherein the one or more sensors output a signal indicative of a characteristic of an environment detected in a substantially forward direction of the vehicle.

16. The vehicle roof structure of claim 15, wherein the receptacle comprises:
a body defining a sensor receiving volume; and
a flange extending along a perimeter of the body.

17. The vehicle roof structure of claim 16, wherein the flange of the receptacle is coupled to the interior portion of the roof panel.

18. The vehicle roof structure of claim 15, wherein the headliner is spaced apart from the interior portion of the roof panel by a distance greater than or equal to a distance the receptacle extends below the interior portion of the roof panel.

19. The vehicle roof structure of claim 15, wherein the spoiler comprises one or more sensor windows, wherein the one or more sensors are positioned behind the one or more sensor windows to provide the signal indicative of the characteristic of the environment of the vehicle detected by the one or more sensors through the one or more sensor windows.

20. The vehicle roof structure of claim 15, wherein the spoiler is constructed of a material that is transparent to the one or more sensors.

* * * * *